July 8, 1924.
M. GOLDBERG
1,500,308
GRIPPING DEVICE FOR CANNING JARS
Filed Aug. 27, 1923
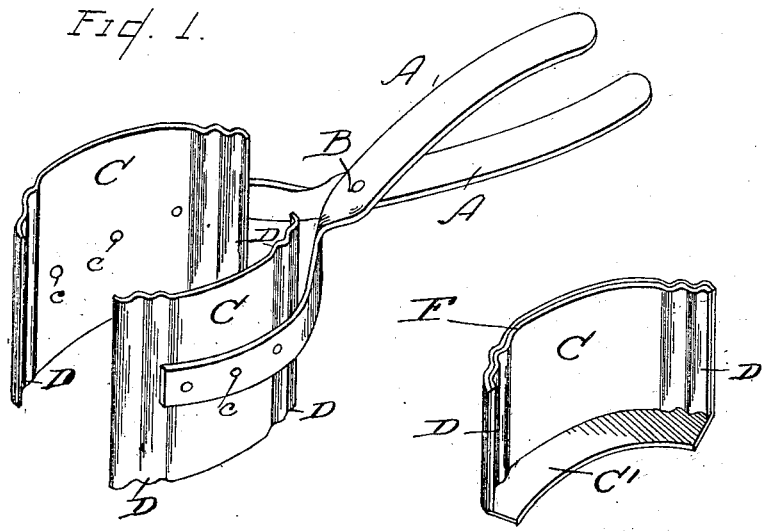
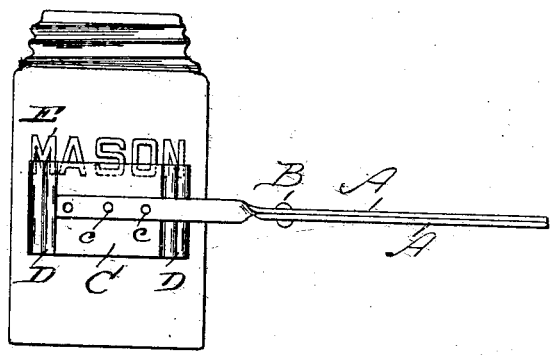
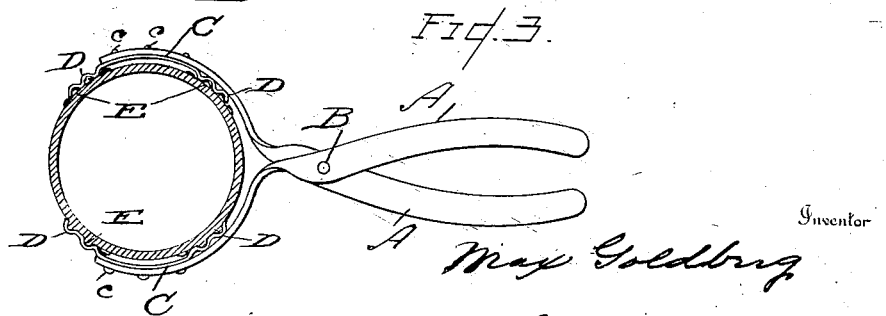

Patented July 8, 1924.

1,500,308

UNITED STATES PATENT OFFICE.

MAX GOLDBERG, OF DETROIT, MICHIGAN.

GRIPPING DEVICE FOR CANNING JARS.

Application filed August 27, 1923. Serial No. 659,481.

*To all whom it may concern:*

Be it known that I, MAX GOLDBERG, citizen of the United States, residing at Detroit, county of Wayne, State of Michigan, have invented a certain new and useful Improvement in Gripping Devices for Canning Jars, and declare the following to be a full, clear, and exact description of the same, such as will enable others skilled in the art to which it pertains to make and use the same, reference being had to the accompanying drawings, which form a part of this specification.

My invention relates to a device for gripping canning jars while screwing down the closure cap.

It is well known in canning fruit or the like that the usual glass jar container becomes very hot due to the heated contents of the jar and thus becomes very uncomfortable and difficult to properly hold while screwing down the cap;—furthermore on account of the relatively large diameter of the jar many women find it impossible to hold the latter even though its contents may be cold.

One of the objects therefore of this invention is to provide a simple device of relatively inexpensive construction which is adapted to grip the usual glass jar of commerce, while screwing down the closure cap.

A further object of this invention is to provide the gripping jaws with vertical corrugations which are designed to impinge upon the raised lettering ordinarily found upon jars of this character.

While the gripping jaws may be provided with a rubber lining to supply the friction necessary to insure a gripping contact with the jar I prefer to construct the device without a rubber lining in order to reduce the cost of manufacture but desire to have it distinctly understood that the use of a lining of rubber or the like is contemplated.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Figure 1 is a perspective view of the device.

Figure 2 is a side elevation of the device as it would appear when gripping a canning jar.

Figure 3 is a cross-sectional view through the jar showing the raised lettered portion of the jar engaged by the corrugations formed in the jaws of the device.

Figure 4 is a modification of one of the jaws showing them provided with flanges on which the jar is adapted to rest.

Referring now to the letters of reference placed upon the drawings:

A, A, represent a pair of hinged members pivoted at B,—being shaped at one end to receive a canning jar and at their opposite ends with handle grips for convenience of operation. C, C, denote relatively broad jaws formed of sheet metal and riveted to the respective members A, A, as at $c$ at the intermediate portion of the jaws between the corrugated terminal engaging portions which are thereby left free to increase the resiliency in the gripping action of the device. The jaws are of arcuate-shaped construction to conform to the wall of a canning jar and are provided with vertical corrugations D, D, at each end of the jaw, whereby they may be adapted to engage the raised lettering E, commonly found on canning jars.

As indicated in Figure 4 the gripping jaws C, C, may be provided with flanges $C^1$ to receive and support the bottom of the jar. The jaws may also be provided with rubber or other lining F, to further increase their frictional gripping qualities.

Having thus indicated the several parts of my invention by reference letters, the construction and operation of the device will be readily understood.

When it is desired to screw a cap in place upon a canning jar the device engages the jar so that the corrugations formed in the ends of the gripping jaws may grip the raised lettering usually provided thereon. The corrugated ends of the jaws when engaged with its lettered surface provides a sure gripping means and prevents the rotation of the jar when screwing down the closure cap. If further frictional gripping contact is desired the walls of the jaws may be lined with sheet rubber as indicated in Figure 4, or other like elastic frictional bearing surface material may be used in place of the sheet rubber.

Having thus described my invention what I claim is:

1. In a device of the character described, a pair of hinged members provided with relatively broad arcuate shaped jaws having terminal engaging portions provided with corrugations extending entirely across the said terminal portions from the upper to the lower edge thereof and adapted to engage the surface of a canning jar.

2. In a device of the character described, a pair of relatively broad arcuate jaws having terminal engaging portions provided with corrugations extending entirely across the said terminal portions from the upper edge to the lower edge thereof, and a pair of hinged members secured to the intermediate portions of the said jaws between the corrugated terminal portions thereof leaving the said terminal portions free in engaging the surface of a canning jar.

In testimony whereof, I sign this specification in the presence of two witnesses.

MAX GOLDBERG.

Witnesses:
S. E. THOMAS,
MAURICE WOLF.